US008631224B2

(12) United States Patent
Moyer

(10) Patent No.: US 8,631,224 B2
(45) Date of Patent: Jan. 14, 2014

(54) SIMD DOT PRODUCT OPERATIONS WITH OVERLAPPED OPERANDS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1521 days.

(21) Appl. No.: 11/854,630

(22) Filed: Sep. 13, 2007

(65) Prior Publication Data

US 2009/0077345 A1    Mar. 19, 2009

(51) Int. Cl.
G06F 7/38 (2006.01)
G06F 9/00 (2006.01)
G06F 9/44 (2006.01)
G06F 15/00 (2006.01)

(52) U.S. Cl.
USPC .......................................... 712/221

(58) Field of Classification Search
USPC ................................ 712/221, 22, 7
See application file for complete search history.

(56) References Cited

U.S. PATENT DOCUMENTS

| | | | |
|---|---|---|---|
| 5,721,892 A * | 2/1998 | Peleg et al. ................. 712/221 |
| 6,094,637 A | 7/2000 | Hong | |
| 6,230,253 B1 * | 5/2001 | Roussel et al. ............... 712/22 |
| 6,847,313 B2 | 1/2005 | Biswas | |
| 6,898,691 B2 | 5/2005 | Blomgren et al. | |
| 6,901,422 B1 | 5/2005 | Sazegari | |
| 7,103,756 B2 * | 9/2006 | Morris ........................ 712/218 |
| 7,275,147 B2 * | 9/2007 | Tavares ....................... 712/224 |
| 7,467,286 B2 * | 12/2008 | Abdallah et al. ................. 712/2 |
| 2005/0125639 A1 | 6/2005 | Symes et al. | |
| 2005/0193050 A1 | 9/2005 | Sazegari | |
| 2008/0114826 A1 | 5/2008 | Mejdrich et al. | |

OTHER PUBLICATIONS

PCT/US2008/071327 International Search Report and Written Opinion.
"AltiVec (TM) Technology Programing Environments Manual"; Apr. 2006; Title Page, Table of Contents; pp. 1-1 thru 1-20 (Ch 1); pp. 4-1 thru 4-38 (Ch 4) and pp. 6-96 thru 6-100; Freescale Semiconductor, Inc.; Austin, TX.

* cited by examiner

Primary Examiner — Corey S Faherty
(74) Attorney, Agent, or Firm — Joanna G. Chiu

(57) ABSTRACT

A data processing system includes a plurality of general purpose registers, and processor circuitry for executing one or more instructions, including a vector dot product instruction for simultaneously performing at least two dot products. The vector dot product instruction identifies a first and second source register, each for storing a plurality of vector elements, where a first dot product is to be performed between a first subset of vector elements of the first source register and a first subset of vector elements of the second source register, and a second dot product is to be performed between a second subset of vector elements of the first source register and a second subset of vector elements of the second source register. The first and second subsets of the second source register are different and at least two vector elements of the first and second subsets of the second source register overlap.

21 Claims, 4 Drawing Sheets

SIMD DOT PRODUCT OPERATIONS WITH OVERLAPPED OPERANDS

BACKGROUND

1. Field

This disclosure relates generally to data processing systems, and more specifically, to SIMD dot product operations with overlapped operands within a data processing system.

2. Related Art

Increased performance in data processing systems can be achieved by allowing parallel execution of operations on multiple elements of a vector. For example, a single-instruction multiple-data (SIMD) scalar processor (also referred to as a "short-vector machine") allows for limited vector processing while using any existing scalar general purpose register (GPR). For example, in a data processing system having 32 scalar 64-bit GPRs, each scalar register may be able to hold 2 32-bit vector elements, 4 16-bit vector elements, or 8 8-bit vector elements and thus able to perform 2 32-bit vector operations, 4 16-bit vector operations, or 8 8-bit vector operations.

The SIMD architecture is amenable to performance enhancement for a variety of different algorithms such as image processing or other algorithms which use linear filters extensively. However, inefficiencies arise when the dimensions of the underlying hardware vectors do not allow for an efficient mapping of the dimensions of the arrays being processed within these algorithms.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
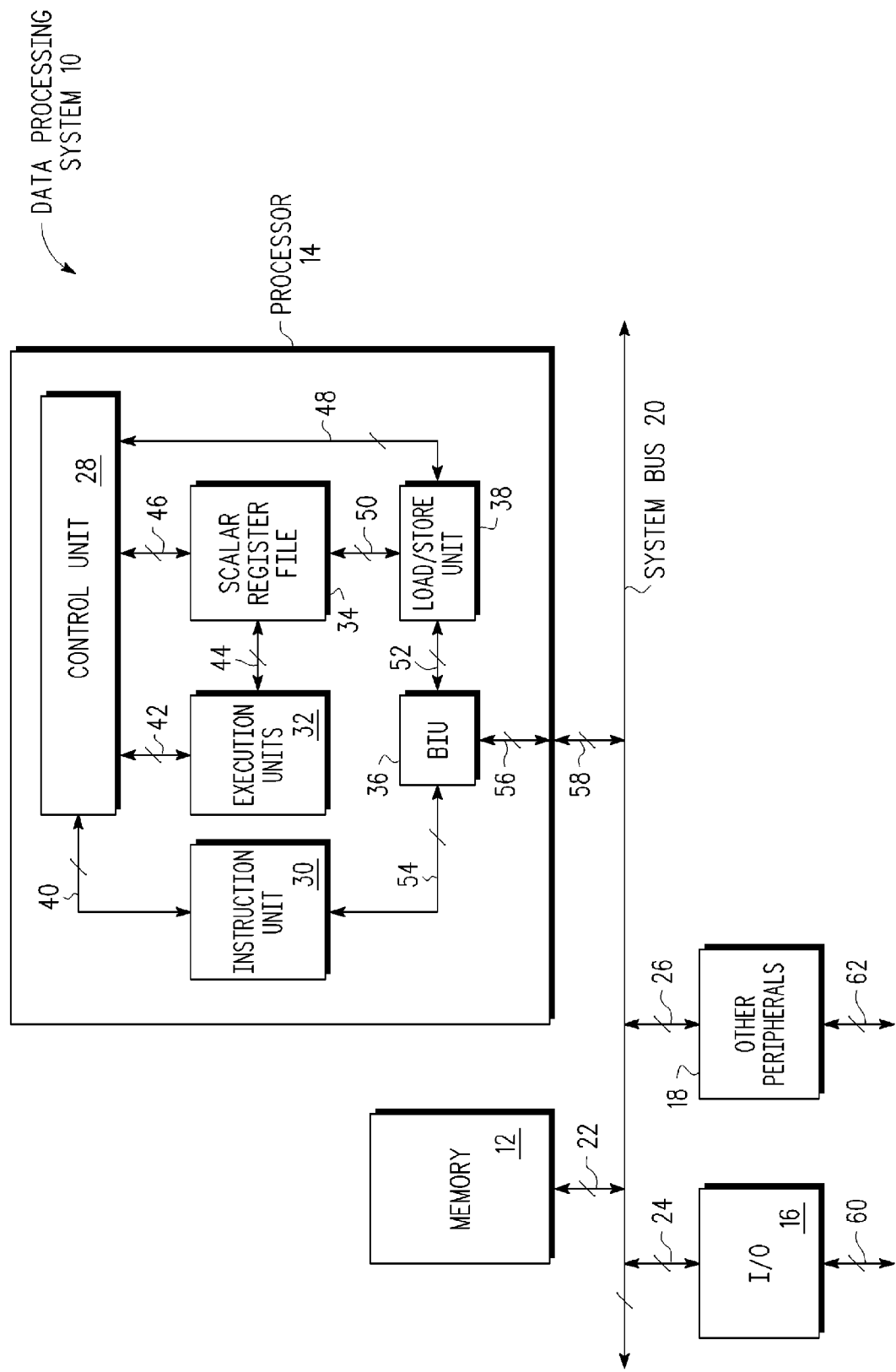
FIG. 1 illustrates, in block diagram form, a data processing system in accordance with an embodiment of the present invention.

Due to the large amount of available data parallelism, SIMD operations may allow for improved performance of vector by matrix and matrix by matrix operations, which are used extensively in a variety of different algorithms, such as in image processing algorithms. For example, current image processing algorithms, as well as other algorithms, use linear filters extensively as part of the feature recognition process. However, inefficiencies may arise when the dimensions of the underlying hardware vectors do not allow for an efficient mapping of the dimensions of the arrays or matrices being processed within these algorithms. For example, one currently available SIMD architecture supports vectors of 8 bytes (8 individual byte vector elements), in which instructions are provided to deal with performing independent dot product operations on the upper four vector elements and the lower four elements. This is highly efficient for operating on 4 by 4 matrices and 4-element vectors, but efficiency is reduced when operating on 3 by 3 and 5 by 5 matrices, which are commonly used in image processing algorithms.

For example, in many image processing algorithms, operations are performed on a pixel and its nearest 8 (thus involving 3 by 3 matrices) or 24 neighbors (thus involving 5 by 5 matrices). The use of 5 by 5 linear filters typically produce better results with fewer artifacts as compared with 3 by 3 linear filters, but are less efficient and require more computations. Therefore, in one embodiment of the present invention, an improved SIMD dot product instruction is provided which may allow for the efficiency of a 5 by 5 matrix operation to equal or exceed that of a 3 by 3 matrix operation performed using the currently available SIMD architecture. In one embodiment, this improved efficiency can be achieved at the cost of only two additional 8 bit by 8 bit multipliers within a SIMD architecture.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

FIG. 1 illustrates in block diagram form, a data processing system 10 in accordance with one embodiment of the present invention. Data processing system 10 includes a processor 14, memory 12, input/output (I/O) 16, other peripherals 18, and a system bus 20. Memory 12 is bidirectionally coupled to system bus 20 via conductors 22, I/O 16 is bidirectionally coupled to system bus 20 via conductors 24, other peripherals 18 is bidirectionally coupled to system bus 20 via conductors 26, and processor 14 is bidirectionally coupled to system bus 20 via conductors 58. In one embodiment, other peripherals 18 may include one or more peripherals, where each can be any type of peripheral, such as a universal asynchronous receiver transmitter (UART), a real time clock (RTC), a keyboard controller, other memories, etc. Some or all of other peripherals 18 may be capable of communicating information external to data processing system 10 via conductors 62. I/O circuitry 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include other elements than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core or processor circuitry. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32, a scalar register file 34, a bus interface unit (BIU) 36, and a load/store unit 38. Control unit 28 is bidirectionally coupled to instruction unit 30 via conductors 40, to execution units 32 via conductors 42, to scalar register file 34 via conductors 46, and to load/store unit 38 via conductors 48. Execution units 32 are bidirectionally coupled to scalar register file 34 via conductors 44, and scalar register file 34 is bidirectionally couple to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information to and from control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, executions units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating point units, etc., where these units may include, for example, multipliers, adders, accumulators, storage for intermediate results, etc.

Scalar register file 34 includes N general purpose registers (GPRs), where N can be any integer greater than or equal to one. In one embodiment, scalar register file 34 includes 32 64-bit registers. As used here in, a scalar register indicates a register which has a one dimensional map and thus holds only one row of data (e.g. a 1 by M-bit register), where M can be any integer greater or equal to one. In one embodiment, M is 64, and each register is thus capable of storing a 64-bit quantity. Scalar register file 34 can provide or receive control information or data to or from control unit 28 via conductors 46.

Operation of processor 14 is generally understood by one of ordinary skill in the art. Therefore, processor 14 will not be described in more detail herein except for those portions that are needed in understanding the various embodiments described in reference to FIGS. 2-4. Also note that existing designs for data processing systems having operands stored in a scalar general purpose register file can be modified as needed to execute the dot product instructions described here. Furthermore, note that since scalar register files may be used, currently existing designs may be retrofitted to allow for the instructions to be described herein. (However, note that the embodiments described herein may be used with any type of register file and is not limited to only scalar register files.)

Figure 2:
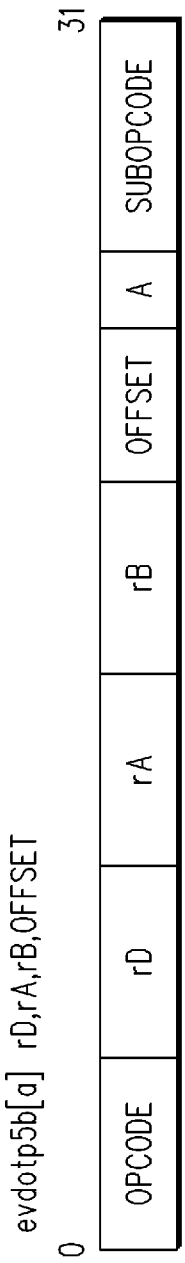
FIG. 2 illustrates a SIMD dot product instruction that may be executed by the data processing system of FIG. 1 in accordance with an embodiment of the present invention.

FIG. 2 illustrates a dot product instruction that may be executed by processing circuitry, such as, for example, by processor 14 of FIG. 1. For example, this instruction can be fetched by instruction unit 30 which provides it, as appropriate, to control unit 28. Control unit 28 can therefore direct load/store unit 38 and execution units 32, as needed, to execute the received instruction, using scalar register file 34 as needed to store data, as will be described in more detail below. Note that, as used herein, a vector element (or register element) refers to an element that can be at most the size of a scalar GPR, but can also be less than the size of a GPR. For example, in the case where scalar register file 34 includes 64-bit registers (M=64), a vector element can be of size 64 bits or less. For example, a vector element may be a byte (8 bits) such that one 64-bit GPR can hold 8 vector elements. Also, a vector element may be a halfword (16 bits) such that one 64-bit GPR can hold 4 vector elements. Similarly, a vector element may be a word (32 bits) such that one 64-bit GPR can hold 2 elements. Also note that as used herein, a byte is denoted by "b", a halfword by "h", and a word by "w". (Note that alternate embodiments, a word or halfword may be defined differently. For example, a word may refer to 16 bits rather than 32 bits. However, as will be used herein, a word refers to 32 bits, for ease of description.)

FIG. 2 illustrates a dot product instruction, evdotp5b[a]. This instruction performs two simultaneous 5 byte vector dot products. In one embodiment, the evdotp5b[a] is a 32-bit instruction which allows for a destination register (rD), two source registers (rA and rB), and an offset to be specified. When the "a" is present at the end of the instruction (e.g. evdot5ba) then accumulation is indicated and when the "a" is not present at the end of the instruction (e.g. evdot5b) then accumulation is not indicated. Therefore, as illustrated in the embodiment of FIG. 2, the evdotp5b[a] instruction includes various fields, such as, for example, an opcode, a destination register (rD), two source registers (rA and rB), an offset, an A bit, and a subopcode. Note that in alternate embodiments, the fields can be arranged differently and a different number of bits can be used to define the instruction and each of the various fields other than the arrangement provided in FIG. 2.

The instruction of FIG. 2 performs two simultaneous dot product operations of five bytes. For each word in the destination, rD, five byte pairs of signed integer vector elements in rA and unsigned integer vector elements in rB are multiplied producing five 16-bit intermediate products. These intermediate products are sign-extended to 32 bits and added together to produce two sums. If the "a" is not present in the instruction, no accumulation is performed, and thus each of the two sums of the intermediate products is placed into a corresponding word of rD. That is, one of the two sums is stored in a first word element of rD, such as in bit locations 0-31, while the other of the two results of the instruction is stored in a second word element of rD, such as in bit locations 32-63. If the "a" is present in the instruction, accumulation is performed. In this case, each of the two sums is added to a corresponding word of the accumulator (ACC1 or ACC2) and stored into a corresponding word of rD. The result in rD is then also placed into the accumulator.

In one embodiment, the same five vector elements of rA are used for both of the simultaneous dot product operations while two different subsets of five vector elements of rB are used for the two simultaneous dot product operations. That is, in this embodiment, a first subset of five vector elements of rB is used for one of the two simultaneous dot product operations and a second subset of five vector elements of rB is used for the other one of the two simultaneous dot product operations. In one embodiment, the first subset and the second subset include overlapping vector elements. For example, as will be described in reference to FIG. 3, the first five vector elements in rA may be used for both of the simultaneous dot product operations while the first subset from rB may include the first five vector elements in rB and the second subset from rB may include the second through the sixth vector elements in rB. Note that in this embodiment, the two subsets of vector elements in rB used for the simultaneous dot product operations are simply shifted from one another by one element within rB, such that 4 of the 5 vector elements in the first and second subsets from rB overlap. In one embodiment, the operands for the two simultaneous dot product operations may be selected so as to assist in 5×5 filtering operations computing two outputs from a set of coefficients in rA and data samples in rB. In one embodiment, the nearest neighbors in the same row as a first pixel value X (the first pixel value X corresponding to the $3^{rd}$ vector element of rB) may be involved in one computational dot product, while the nearest neighbors of a second pixel value Y (the second pixel value Y corresponding to the $4^{th}$ element of rB) may be involved in a second simultaneous dot product operation to produce two independent outputs. In this case, the neighbors of X and Y overlap, thus overlapping vectors of elements in rB are involved in the simultaneous dot product computations.

The offset field indicates which five vector elements of rA should be selected for the dot product operation. That is, if offset is zero or an offset is not present, then the first five vector elements are to be used (as in the example of FIG. 3); however, if the offset is two, then the third through the seventh vector elements are to be used (as in the example of FIG. 4). As will be described in reference to FIG. 4, which uses an offset of two (offset=2), the third through seventh vector elements of rA are used for both of the simultaneous dot product operation while the first subset from rB includes the third through seventh vector elements of rB and the second subset from rB includes the fourth through eighth vector elements of rB. Note that in the examples of FIGS. 3 and 4, the five vector elements of rA and the five vector elements of the first subset of rB correspond to the same vector element locations (i.e. the first five vector elements in FIG. 3 and the third through seventh vector elements in FIG. 4). However, in alternate embodiments, such as with the use of an additional offset field for rB, this may not be the case. In an alternate embodiment, independent offset fields for the vector elements of rA and the vector elements of rB may be specified. Additionally, an alternate embodiment may provide a different degree of overlap of the first and second subsets of elements of rB.

In the illustrated embodiments, each of rA, rB, and rD is one of the 64-bit registers in scalar register file 34. Also, in the embodiment of FIG. 2, source register rA provides five signed integer elements and source register rB provides five unsigned integer elements. However, note that in alternate embodiments, each of rA and rB may store signed or unsigned vector elements and each of rA and rB may store fractional or integer vector elements. Therefore, different opcode or subopcode encodings may be used to indicate whether each of rA and rB is signed or unsigned, fractional or integer. Alternatively, additional fields in the evdotp5b[a] instruction may be used to indicate whether each of rA and rB is signed or unsigned, fractional or integer. Also, different opcode or subopcode encodings or additional fields may be used to indicate whether the intermediate products are modulo or saturate products or whether sums or differences of the intermediate products are to be performed. Also, in an alternate embodiment, the offset field may not be present, where the first five vector elements of rA are always used. In yet another embodiment, a second offset field may also be provided to indicate which elements of rB should be selected. Also, note that the instruction formats used to indicate the fields of the instructions may vary. For example, different instructions all together may be used which offer different combination of options or additional fields in an instruction may be used to allow a user to select different options. Different examples of the operation of the evdotp5b[a] instruction will be discussed in reference to FIGS. 3 and 4 below.

Figure 3:
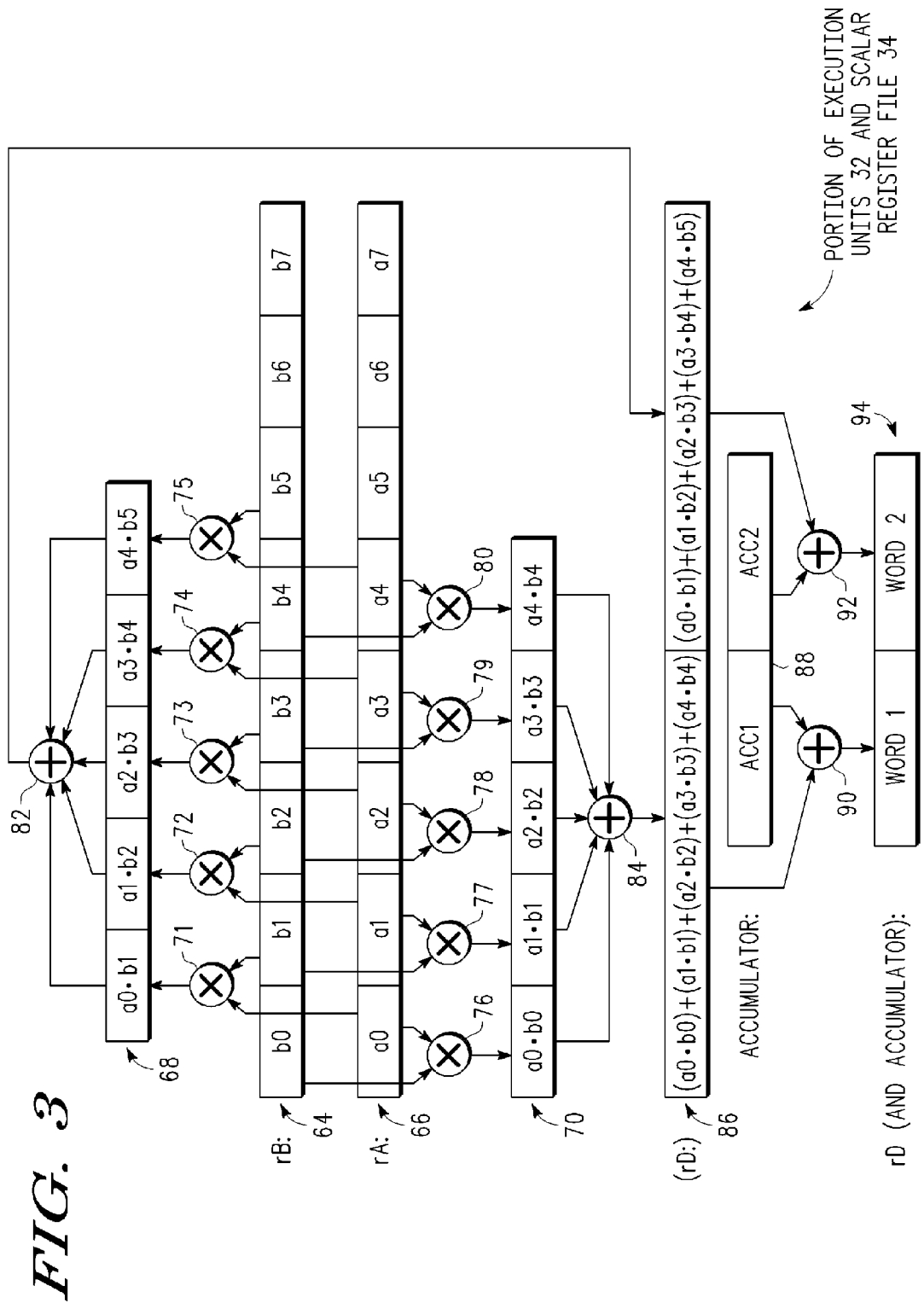
FIG. 3 illustrates, in block diagram form, a portion of the execution units and scalar register file of FIG. 1 during a SIMD dot product operation in accordance with an embodiment of the present invention.

FIG. 3 illustrates a portion of execution units 32 and scalar register file 34 and an example data flow illustrating operation of an evdotp5ba instruction (in which accumulation is performed, and in which an offset field is not present or is provided as zero). FIG. 3 includes a register 66 which represents source register rA, a register 64 which represents source register rB, and a register 94 which represents destination register rD having a first word, WORD 1, and a second word, WORD 2. FIG. 3 also includes storage locations 68 and 70 for storing intermediate products, and storage location 86 for storing the dot products. FIG. 3 also includes accumulator 88 which includes a first word, ACC1, and a second word, ACC2. FIG. 3 also includes multipliers 71-75 and adder 82 which are used to perform one of the two simultaneous dot product operations and multipliers 76-80 and adder 84 to perform the other of the two simultaneous dot product operations. FIG. 3 also includes adders 90 and 92 which are used to add each of the dot product results with the values in accumulator 88 and update rD. After updating rD, note that accumulator 88 is updated with the updated value of rD.

In operation, rA (register 66) stores 8 vector elements a0-a7 and rB (register 64) stores 8 vector elements b0-b7. Since the example of FIG. 3 does not specify an offset or uses an offset of zero, both of the simultaneous dot product operations use the first five vector elements of rA (a0-a4). Therefore, one of the two simultaneous dot product operations uses the first five vector elements of rB (b0-b4) while the other of the two simultaneous dot product operations uses the next five vector elements of rB (b1-b5), which is shifted by one element as compared to b0-b4. Note that b0-b4 may be referred to as a first subset of rB and b1-b5 may be referred to as a second subset of rB. Storage location 70 stores five intermediate products corresponding to product pairs a0-a4 and b0-b4. That is, multiplier 76 multiplies a0 by b0 and stores the result in a first field of storage location 70, multiplier 77 multiplies a1 by b1 and stores the result in a second field of storage location 70, multiplier 78 multiplies a2 by b2 and stores the result in a third field of storage location 70, multiplier 79 multiplies a3 by b3 and stores the result in a fourth field of storage location 70, and multiplier 80 multiplies a4 by b4 and stores the result in a fifth field of storage location 70. These five intermediate products are then summed by adder 84 and this resulting sum is stored in a first word of storage location 86. Storage location 68 stores five intermediate products corresponding to product pairs a0-a4 and b1-b5. That is, multiplier 71 multiplies a0 by b1 and stores the result in a first field of storage location 68, multiplier 72 multiplies a1 by b2 and stores the result in a second field of storage location 68, multiplier 73 multiplies a2 by b3 and stores the result in a third field of storage location 68, multiplier 74 multiplies a3 by b4 and stores the result in a fourth field of storage location 68, and multiplier 75 multiplies a4 by b5 and stores the result in a fifth field of storage location 68. These five intermediate products are then summed by adder 82 and this resulting sum is stored in a second word of storage location 86.

Therefore, note that register 86 stores two dot product results which were performed simultaneously using multipliers 76-80 and adder 84 for the first result and multipliers 71-75 and adder 82 for the second result. Adder 90 is then used to add the first dot product result (resulting from a dot product of a0-a4 and b0-b4) to a corresponding accumulator value, ACC1, stored in a first word of accumulator 88, where the resulting sum is stored in a first corresponding word, WORD 1, of rD (register 94). Similarly, adder 92 is used (simultaneous to the addition performed by adder 90) to add the second dot product result (resulting from a dot product of a0-a4 and b1-b5) to a corresponding accumulator value, ACC2, stored in a second word of accumulator 88, where the resulting sum is stored in a second corresponding word, WORD 2, of rD. The values stored in rD can then be stored to accumulator 88 to update the values of ACC1 and ACC2 with the new results.

Note that in an embodiment where accumulation is not to be performed, then register 86 of FIG. 3 would represent rD where rD would directly store the results of the two simultaneous dot product operations.

Figure 4:
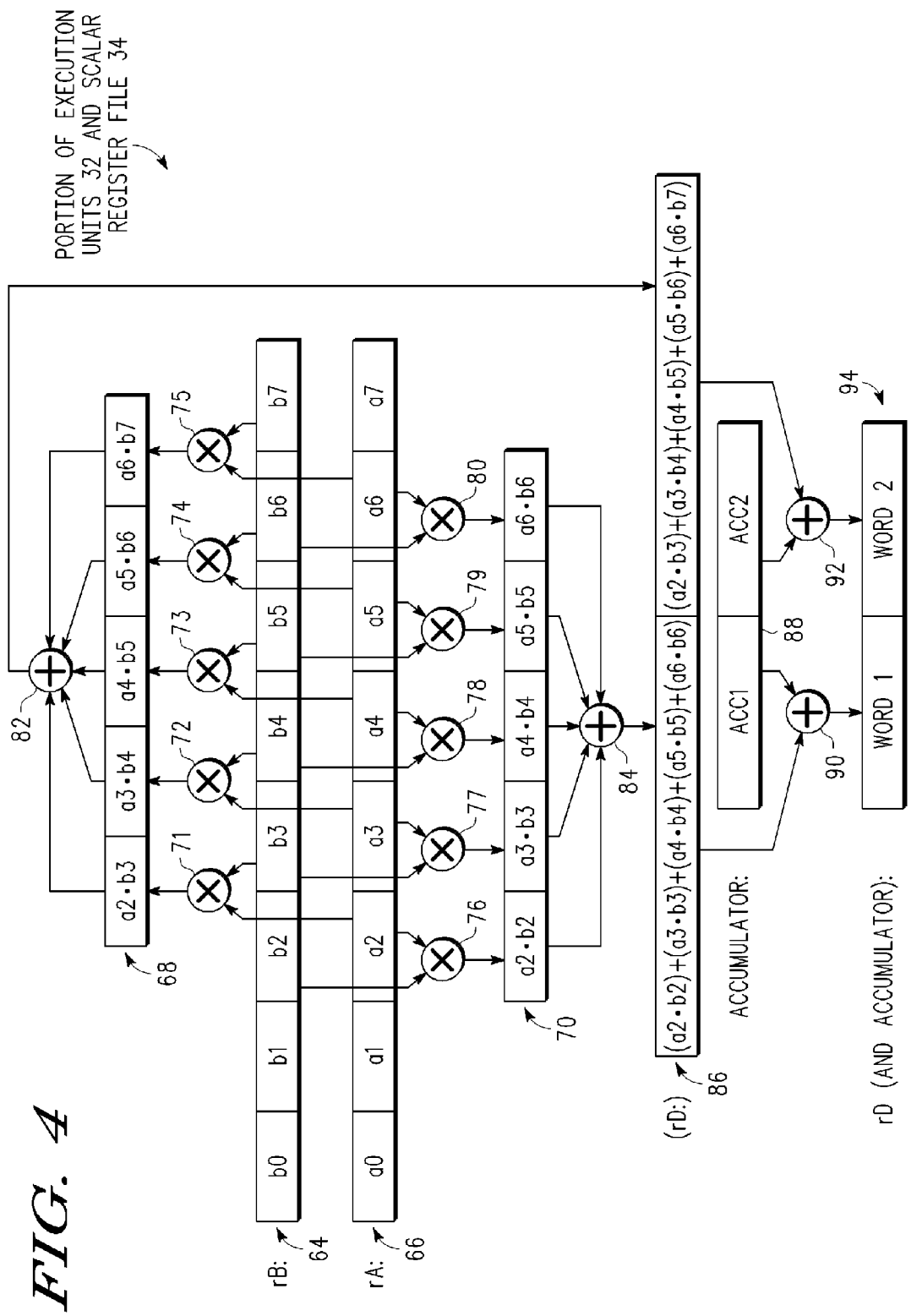
FIG. 4 illustrates, in block diagram form, a portion of the execution units and scalar register file of FIG. 1 during a SIMD dot product operation using offsets in accordance with an embodiment of the present invention.

FIG. 4 illustrates a portion of execution units 32 and scalar register file 34 and another example data flow illustrating operation of an evdotp5ba instruction (in which accumulation is performed, and in which an offset field is set to two). Operation of FIG. 4 is similar to that of FIG. 3 in which like numbers indicate like elements. The data flow of FIG. 4 is similar to that of FIG. 3 except that an offset of 2, which corresponds to an offset of the vector elements in rA, is used. That is, unlike the example of FIG. 3 which performs simultaneous dot products of a0-a4 and b0-b4 and of a0-a4 and b1-b4, the example of FIG. 4 performs simultaneous dot products of a2-a6 and b2-b6 and of a2-a6 and b3-b7. That is, note that the five vector elements of rA being used is offset by 2 from a0. Therefore, similarly, the five vector elements of the first subset of rB and the five vector elements of the second subset of rB are offset by 2 as compared to the corresponding subsets of the example of FIG. 3. As in the example of FIG. 3, note that the second subset of rB (b3-b7) is shifted by one element as compared to the first subset of rB (b2-b6) such that 4 of the five vector elements of rB are overlapping in the two simultaneous dot product operations.

Referring to the example of FIG. 4, storage location 70 stores five intermediate products corresponding to product pairs a2-a6 and b2-b6. That is, multiplier 76 multiplies a2 by b2 and stores the result in a first field of storage location 70, multiplier 77 multiplies a3 by b3 and stores the result in a second field of storage location 70, multiplier 78 multiplies a4 by b4 and stores the result in a third field of storage location 70, multiplier 79 multiplies a5 by b5 and stores the result in a fourth field of storage location 70, and multiplier 80 multiplies a6 by b6 and stores the result in a fifth field of storage location 70. These five intermediate products are then summed by adder 84 and this resulting sum is stored in a first word of storage location 86. Storage location 68 stores five intermediate products corresponding to product pairs a2-a6 and b3-b7. That is, multiplier 71 multiplies a2 by b3 and stores the result in a first field of storage location 68, multiplier 72 multiplies a3 by b4 and stores the result in a second field of storage location 68, multiplier 73 multiplies a4 by b5 and stores the result in a third field of storage location 68, multiplier 74 multiplies a5 by b6 and stores the result in a fourth field of storage location 68, and multiplier 75 multiplies a6 by b7 and stores the result in a fifth field of storage location 68. These five intermediate products are then summed by adder 82 and this resulting sum is stored in a second word of storage location 86.

Therefore, note that register 86 stores two dot product results which were performed simultaneously using multipliers 76-80 and adder 84 for the first result and multipliers 71-75 and adder 82 for the second result. Adder 90 is then used to add the first dot product result (resulting from a dot product of a2-a6 and b2-b6) to a corresponding accumulator value, ACC1, stored in a first word of accumulator 88, where the resulting sum is stored in a first corresponding word, WORD 1, of rD (register 94). Similarly, adder 92 is used (simultaneous to the addition performed by adder 90) to add the second dot product result (resulting from a dot product of a2-a6 and b3-b7) to a corresponding accumulator value, ACC2, stored in a second word of accumulator 88, where the resulting sum is stored in a second corresponding word, WORD 2, of rD. The values stored in rD can then be stored to accumulator 88 to update the values of ACC1 and ACC2 with the new results.

Note that in an embodiment where accumulation is not to be performed, then register 86 of FIG. 4 would represent rD where rD would directly store the results of the two simultaneous dot product operations.

Note that in systems which provide for efficient 3 by 3 or 4 by 4 matrix operations using registers which store eight vector elements each, typically only 8 multipliers are provided where a pair of dot product operations are performed on corresponding disjoint (i.e. non-overlapping) sets of 4 elements from the source registers. However, such systems are inefficient for 5 by 5 matrix operations (or for other dimensions which do not match well with the eight vector element registers). Therefore, note that through the use of two additional multipliers (e.g. 75 and 80) and overlapping subsets of source register rB, as described herein, improved efficiency of a 5 by 5 dot product operation may be obtained. These type of operations may be especially useful in applications which rely heavily on five by five matrix operations. In other types of operations, which may rely heavily on matrix operations of another dimension, an instruction similar to the evdotp5b[a] instruction can be used in which there are a small number of additional multipliers and in which simultaneous dot products of a0-aN with b0-bN and a0-aN with b1-b(N+1) can be performed. Also, in an alternate embodiment, different subsets of rA and rB may be used. For example, rather than the example subsets rA and rB provided in FIG. 3, simultaneous dot products of a first subset of rA and a first subset of rB and of a second subset of rA and a second subset of rB may be performed, where each of the subsets of rA may be the same subset or different subsets with overlapping elements and where each of the subsets of rB may also be the same subset or different subsets with overlapping elements. Also, an additional offset may also be provided for the elements of rB. For example, in FIG. 3, if an offset of 2 were specified for rB, then rather than the first subset of rB being b0-b4 and the second subset being b1-b5, the first subset for one of the two dot product operations would be b2-b6 and the second subset for the other dot product operation would be b3-b7. Also, an additional overlap specifier may also be provided for the elements of rB to indicate by how many vector elements the second subset of rB is shifted with respect to the first subset of rB. For example, in FIG. 3, if an overlap specifier of 2 was specified for rB, then rather than the first subset of rB being b0-b4 and the second subset being b1-b5, the first subset for one of the two dot product operations would be b0-b4 and the second subset for the other dot product operation would be b2-b6.

By now it should be appreciated that there has been provided an instruction and circuitry which improves efficiency of some matrix operations such as, for example, a 5 by 5 dot product operation in which two simultaneous dot product operations of 5 vector elements are performed where the two simultaneous dot product operations using overlapping operands. Furthermore, for efficient 3 by 3 or 4 by 4 matrix operations using eight vector element registers, typically only 8 multipliers are provided in a system. However, through the presence of two additional multipliers and through the use of overlapping operands, a more efficient 5 by 5 matrix operation using eight vector element registers may be achieved.

In addition to the evdotp5b[a] instruction variants described, an embodiment of the present invention may also support additional known instructions to perform traditional dot product operations involving a pair of 4 by 4 dot product computations. During 4 by 4 dot product operations, the additional multipliers remain unused, and may be powered off or otherwise gated to prevent unnecessary energy consumption. The enabling of the additional multipliers and associated summation circuitry may be conditionalized based on the type of operation being performed so as to optimize the power consumption of the data processing system. Alternatively, the outputs of the additional multipliers may be forced to a predetermined output value, such as zero, when not required as part of the instruction undergoing execution.

In one embodiment, a data processing system includes a plurality of general purpose registers, and processor circuitry for executing one or more instructions, where the one or more instructions includes a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, where a first dot product of the at least two dot products is to be performed between a first subset of vector elements of the first source register and a first subset of vector elements of the second source register, and a second dot product of the at least two dot products is to be performed between a second subset of vector elements of the first source register and a second subset of vector elements of the second source register, and where the first and second subsets of the second source register are different and wherein at least two vector elements of the first and second subsets of the second source register overlap.

In a further embodiment, the vector dot product instruction further identifies a destination register for storing a result of the first dot product and a result of the second dot product.

In another further embodiment, the processor circuitry further includes an accumulator, and the vector dot product instruction further identifies a destination register for storing a sum of a result of the first dot product and a first value of the accumulator and a sum of a result of the second dot product and a second value of the accumulator.

In another further embodiment, the first and second subsets of the first source register are a same subset.

In another further embodiment, the first subset of vector elements of the first source register corresponds to same vector element locations as the first subset of vector elements of the second source register.

In another further embodiment, the vector dot product instruction further indicates an offset for use in at least indicating which vector elements of the first source register are to be included in the first subset of vector elements of the first source register. In yet a further embodiment, the vector dot product instruction further indicates a second offset for use in at least indicating which vector elements of the second source register are to be included in the first subset of vector elements of the second source register.

In another further embodiment, the vector dot product instruction further indicates an offset for use in at least indicating which vector elements of the second source register are to be included in the first subset of vector elements of the second source register.

In another embodiment, a data processing system includes a plurality of general purpose registers, and processor circuitry for executing one or more instructions, where the one or more instructions includes a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, where a first dot product of the at least two dot products is to be performed between a first subset of five vector elements of the first source register and a first subset of five vector elements of the second source register, and a second dot product of the at least two dot products is to be performed between a second subset of five vector elements of the first source register and a second subset of five vector elements of the second source register, and where four vector elements of the first and second subsets of the second source register overlap.

In a further embodiment of the another embodiment, the vector dot product instruction further identifies a destination register for storing a result of the first dot product and a result of the second dot product.

In another further embodiment of the another embodiment, the processor circuitry further includes an accumulator, and where the vector dot product instruction further identifies a destination register for storing a sum of a result of the first dot product and a first value of the accumulator and a sum of a result of the second dot product and a second value of the accumulator.

In another further embodiment of the another embodiment, the first and second subsets of the first source register are a same subset.

In another further embodiment of the another embodiment, the first subset of vector elements of the first source register corresponds to same vector element locations as the first subset of vector elements of the second source register.

In another further embodiment of the another embodiment, each of the first and second source registers identified by the vector dot product instruction is for storing eight vector elements, and where the processor circuitry comprises ten multipliers, five of which for performing the first dot product and the other five of which for performing the second dot product.

In another further embodiment of the another embodiment, the vector dot product instruction further indicates an offset for use in at least indicating which vector elements of the first or second source register are to be included in the first subset of vector elements of the first or second source register.

In yet another embodiment, a method for performing simultaneous dot product operations includes providing a plurality of general purpose registers, and providing processor circuitry for executing one or more instructions, where the one or more instructions comprising a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, where a first dot product of the at least two dot products is to be performed between a first subset of vector elements of the first source register and a first subset of vector elements of the second source register, and a second dot product of the at least two dot products is to be performed between a second subset of vector elements of the first source register and a second subset of vector elements of the second source register, and where the first and second subsets of the second source register are different and wherein at least two vector elements of the first and second subsets of the second source register overlap.

In a further embodiment of the yet another embodiment, the vector dot product instruction further identifies a destination register for storing a result of the first dot product and a result of the second dot product.

In another further embodiment of the yet another embodiment, the processor circuitry further includes an accumulator, and where the vector dot product instruction further identifies a destination register for storing a sum of a result of the first dot product and a first value of the accumulator and a sum of the a result of the second dot product and a second value of the accumulator.

In another further embodiment of the yet another embodiment, the first and second subsets of the first source register are a same subset.

In another further embodiment of the yet another embodiment, the vector dot product instruction further indicates an offset for use in at least indicating which vector elements of the first or second source register are to be included in the first subset of vector elements of the first or second source register.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing SIMD architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 12 may be located on a same integrated circuit as processor 14 or on a separate integrated circuit or located within another peripheral or slave discretely separate from other elements of system 10. Other peripherals 18 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, other SIMD architectures may be used and different subsets of vector elements may be defined. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
a plurality of general purpose registers;
processor circuitry for executing one or more instructions, the one or more instructions comprising a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, wherein a first dot product of the at least two dot products is to be performed between a first subset of vector elements of the first source register and a first subset of vector elements of the second source register, and a second dot product of the at least two dot products is to be performed between a second subset of vector elements of the first source register and a second subset of vector elements of the second source register, wherein the first and second subsets of the second source register are different and wherein at least two vector elements of the first and second subsets of the second source register overlap, and wherein each of the at least two overlapping vector elements of the second source register is used in both the first dot product and the second dot product with different vector elements of the first source register.

2. The data processing system of claim 1, wherein the vector dot product instruction further identifies a destination register for storing a result of the first dot product and a result of the second dot product.

3. The data processing system of claim 1, wherein the processor circuitry further comprises an accumulator, and wherein the vector dot product instruction further identifies a destination register for storing a sum of a result of the first dot product and a first value of the accumulator and a sum of a result of the second dot product and a second value of the accumulator.

4. The data processing system of claim 1, wherein the first and second subsets of the first source register are a same subset.

5. The data processing system of claim 1, wherein the first subset of vector elements of the first source register corresponds to same vector element locations as the first subset of vector elements of the second source register.

6. The data processing system of claim 1, wherein the vector dot product instruction further indicates an offset for use in at least indicating which vector elements of the first source register are to be included in the first subset of vector elements of the first source register.

7. The data processing system of claim 6, wherein the vector dot product instruction further indicates a second offset for use in at least indicating which vector elements of the second source register are to be included in the first subset of vector elements of the second source register.

8. The data processing system of claim 1, wherein the vector dot product instruction further indicates an offset for use in at least indicating which vector elements of the second source register are to be included in the first subset of vector elements of the second source register.

9. The data processing system of claim 1, wherein the first subset of vector elements of the first source register and the second subset of vector elements of the first source register have overlapping vector elements, wherein each of the overlapping vector elements of the first source register is used in both the first dot product and the second dot product with different vector elements of the second source register.

10. A data processing system, comprising:
a plurality of general purpose registers; and
processor circuitry for executing one or more instructions, the one or more instructions comprising a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, wherein a first dot product of the at least two dot products is to be performed between a first subset of five vector elements of the first source register and a first subset of five vector elements of the second source register, and a second dot product of the at least two dot products is to be performed between a second subset of five vector elements of the first source register and a second subset of five vector elements of the second source register, wherein four vector elements of the first and second subsets of the second source register overlap, and wherein each of the four overlapping vector elements of the second source register is used in both the first dot product and the second dot product with different vector elements of the first source register.

11. The data processing system of claim 10, wherein the vector dot product instruction further identifies a destination register for storing a result of the first dot product and a result of the second dot product.

12. The data processing system of claim 10, wherein the processor circuitry further comprises an accumulator, and wherein the vector dot product instruction further identifies a destination register for storing a sum of a result of the first dot product and a first value of the accumulator and a sum of the a result of the second dot product and a second value of the accumulator.

13. The data processing system of claim 10, wherein the first and second subsets of the first source register are a same subset.

14. The data processing system of claim 10, wherein the first subset of vector elements of the first source register corresponds to same vector element locations as the first subset of vector elements of the second source register.

15. The data processing system of claim 10, wherein each of the first and second source registers identified by the vector dot product instruction is for storing eight vector elements, and wherein the processor circuitry comprises ten multipliers, five of which for performing the first dot product and the other five of which for performing the second dot product.

16. The data processing system of claim 10, wherein the vector dot product instruction further indicates an offset for use in at least indicating which vector elements of the first or second source register are to be included in the first subset of vector elements of the first or second source register.

17. A method for performing simultaneous dot product operations, comprising:
providing a plurality of general purpose registers; and
providing processor circuitry for executing one or more instructions, the one or more instructions comprising a vector dot product instruction for simultaneously performing at least two dot products, the vector dot product instruction identifying a first source register from the plurality of general purpose registers, and a second source register from the plurality of general purpose registers, each of the first source register and the second source register for storing a plurality of vector elements, wherein a first dot product of the at least two dot products is to be performed between a first subset of vector elements of the first source register and a first subset of vector elements of the second source register, and a second dot product of the at least two dot products is to be performed between a second subset of vector elements of the first source register and a second subset of vector elements of the second source register, wherein the first and second subsets of the second source register are different and wherein at least two vector elements of the first and second subsets of the second source register overlap, and wherein each of the at least two overlapping vector elements of the second source register is used in both the first dot product and the second dot product with different vector elements of the first source register.

18. The method of claim 17, wherein the vector dot product instruction further identifies a destination register for storing a result of the first dot product and a result of the second dot product.

19. The method of claim 17, wherein the processor circuitry further comprises an accumulator, and wherein the vector dot product instruction further identifies a destination register for storing a sum of a result of the first dot product and a first value of the accumulator and a sum of the a result of the second dot product and a second value of the accumulator.

20. The method of claim 17, wherein the first and second subsets of the first source register are a same subset.

21. The method of claim 17, wherein the vector dot product instruction further indicates an offset for use in at least indicating which vector elements of the first or second source register are to be included in the first subset of vector elements of the first or second source register.

* * * * *